United States Patent
Chan et al.

[19]

[11] Patent Number: 6,142,059
[45] Date of Patent: Nov. 7, 2000

[54] METHOD AND APPARATUS FOR SENSING THE ORIENTATION OF A MECHANICAL ACTUATOR

[75] Inventors: Danley C. Chan, West Burlington, Iowa; Alan D. Berger, Winfield, Ill.

[73] Assignee: Case Corporation, Racine, Wis.

[21] Appl. No.: 09/215,359

[22] Filed: Dec. 18, 1998

Related U.S. Application Data

[63] Continuation-in-part of application No. 08/753,791, Nov. 27, 1996, Pat. No. 5,977,778.
[51] Int. Cl.[7] ..................................................... F01B 25/26
[52] U.S. Cl. ................................................ 92/5 R; 91/361
[58] Field of Search ........................... 92/5 R; 91/1, 361, 91/363 R

[56] References Cited

U.S. PATENT DOCUMENTS

| | | |
|---|---|---|
| 3,160,836 | 12/1964 | Farley . |
| 3,714,846 | 2/1973 | Louis et al. . |
| 3,744,344 | 7/1973 | Olsen et al. . |
| 3,796,111 | 3/1974 | Schauer . |

(List continued on next page.)

FOREIGN PATENT DOCUMENTS

| | | |
|---|---|---|
| 266606A2 | 5/1988 | European Pat. Off. . |
| 0 444 472 A2 | 9/1991 | European Pat. Off. . |
| 3116333A1 | 11/1982 | Germany . |
| 43 11 084C1 | 9/1994 | Germany . |
| 94 17204 U | 2/1995 | Germany . |
| 2172995A | 10/1986 | United Kingdom . |

OTHER PUBLICATIONS

Brochure: Understanding Magnetostrictive LDTs, Hydraulics & Pneumatics, by W.D. Peterson, Feb., 1993.
Brochure: Penny+Giles Product Data, Cylinder Transducer Model HLP100.
Brochure: TECHNIK, Absolute Position Measurement Using Conductive Plastic Potentiometers.
Brochure: Penny+Giles, Technology Leaders in Displacement Monitoring & Manual Control, Jul., 1989.
Brochure: DC Hydrastar, Position Transducer.
Sensors: An LVDT Primer, Jun., 1996.
Magazine: Business Week, Not Just a Blip on the Screen, Feb. 19, 1996.

*Primary Examiner*—Edward K. Look
*Assistant Examiner*—Hermes Rodriguez
*Attorney, Agent, or Firm*—Foley & Lardner

[57] ABSTRACT

A system for determining the extended length or orientation of a hydraulic actuator, or of an implement or joint, is disclosed herein. Electromagnetic (EM) bursts such as ultra-wideband or frequency pulses are generated and applied to a transmitter unit attached to a stationary or moveable portion of the actuator. The EM bursts are launched by the transmitter toward a receiver located on the other of the stationary or moveable portion of the actuator. The time for the EM bursts to travel between the associated antennas of the transmitter and the receiver is determined and converted into a position signal representing the distance therebetween.

31 Claims, 2 Drawing Sheets

U.S. PATENT DOCUMENTS

| | | |
|---|---|---|
| 3,903,756 | 9/1975 | Hamma . |
| 4,019,404 | 4/1977 | Schauer . |
| 4,126,047 | 11/1978 | Sethares et al. . |
| 4,138,907 | 2/1979 | Melles . |
| 4,259,881 | 4/1981 | Meyerle . |
| 4,348,855 | 9/1982 | DePauw et al. . |
| 4,471,668 | 9/1984 | Elsner . |
| 4,487,002 | 12/1984 | Kruse et al. . |
| 4,520,660 | 6/1985 | Hitchcock . |
| 4,543,649 | 9/1985 | Head et al. . |
| 4,584,472 | 4/1986 | Wiblin et al. . |
| 4,588,953 | 5/1986 | Krage . |
| 4,631,478 | 12/1986 | Knetch et al. . |
| 4,689,553 | 8/1987 | Haddox . |
| 4,694,648 | 9/1987 | Beck, Jr. . |
| 4,737,705 | 4/1988 | Bitar et al. . |
| 4,742,794 | 5/1988 | Hagstrom . |
| 4,749,936 | 6/1988 | Taplin . |
| 4,757,745 | 7/1988 | Taplin . |
| 4,774,465 | 9/1988 | Nilius . |
| 4,866,269 | 9/1989 | Wlodarcxyk et al. . |
| 4,901,628 | 2/1990 | Krage . |
| 4,913,004 | 4/1990 | Panoushek et al. . |
| 4,938,054 | 7/1990 | Dye et al. . |
| 4,961,055 | 10/1990 | Habib et al. . |
| 4,987,823 | 1/1991 | Taplin et al. . |
| 5,000,650 | 3/1991 | Brewer et al. . |
| 5,104,144 | 4/1992 | Bethell . |
| 5,150,049 | 9/1992 | Schuetz . |
| 5,150,060 | 9/1992 | Bitar . |
| 5,182,979 | 2/1993 | Morgan . |
| 5,182,980 | 2/1993 | Greer . |
| 5,233,293 | 8/1993 | Huang et al. . |
| 5,241,278 | 8/1993 | Bitar . |
| 5,247,172 | 9/1993 | Riemer . |
| 5,260,665 | 11/1993 | Goldberg et al. . |
| 5,274,271 | 12/1993 | McEwan . |
| 5,325,063 | 6/1994 | Morgan . |
| 5,332,938 | 7/1994 | McEwan . |
| 5,345,471 | 9/1994 | McEwan . |
| 5,361,070 | 11/1994 | McEwan . |
| 5,421,416 | 6/1995 | Orbach et al. . |
| 5,422,607 | 6/1995 | McEwan . |
| 5,438,261 | 8/1995 | Codina et al. . |
| 5,438,274 | 8/1995 | Bitar et al. . |
| 5,455,769 | 10/1995 | Panoushek et al. . |
| 5,457,394 | 10/1995 | McEwan . |
| 5,465,094 | 11/1995 | McEwan . |
| 5,471,147 | 11/1995 | Allen et al. . |
| 5,471,162 | 11/1995 | McEwan . |
| 5,479,120 | 12/1995 | McEwan . |
| 5,491,422 | 2/1996 | Bitar et al. . |
| 5,494,142 | 2/1996 | Kale . |
| 5,505,267 | 4/1996 | Orbach et al. . |
| 5,510,800 | 4/1996 | McEwan . |
| 5,512,834 | 4/1996 | McEwan . |
| 5,517,198 | 5/1996 | McEwan . |
| 5,519,342 | 5/1996 | McEwan . |
| 5,519,400 | 5/1996 | McEwan . |
| 5,521,600 | 5/1996 | McEwan . |
| 5,523,760 | 6/1996 | McEwan . |
| 5,536,536 | 7/1996 | Kelley . |
| 5,540,137 | 7/1996 | Lark et al. . |
| 5,549,185 | 8/1996 | Kale . |
| 5,563,605 | 10/1996 | McEwan . |
| 5,573,012 | 11/1996 | McEwan . |
| 5,576,627 | 11/1996 | McEwan . |
| 5,581,256 | 12/1996 | McEwan . |
| 5,589,838 | 12/1996 | McEwan . |
| 5,609,059 | 3/1997 | McEwan . |
| 5,617,034 | 4/1997 | Lark et al. . |
| 5,661,490 | 8/1997 | McEwan . |
| 5,667,452 | 9/1997 | Coutant . |
| 5,977,778 | 11/1999 | Chan et al. .............................. 92/5 R | ns
METHOD AND APPARATUS FOR SENSING THE ORIENTATION OF A MECHANICAL ACTUATOR

CROSS-REFERENCE TO RELATED APPLICATION

This application is a contiuation-in-part of U.S. patent application Ser. No. 08/753,791, entitled "Method and Aparatus for Sensing Piston Position", filed on Nov. 27, 1996 by Chan et al., issued as U.S. Pat. No. 5,977,778 on Nov. 2, 1999.

FIELD OF THE INVENTION

The invention generally relates to determining the position or orientation of an implement or joint of an agricultural vehicle (e.g., tractor, combine, etc.), or construction vehicle (e.g., backhoe, crane, dozer, trencher, wheeled, tracked, or skid-steer loader, etc.). In particular, the invention relates to transmitting electromagnetic (EM) bursts in physical relation to a hydraulic or pneumatic actuator (e.g. piston/cylinder arrangement) used to move an implement or joint and determining a length or orientation of the actuator based upon the time between transmitting and receiving the bursts. Based upon the length or orientation of the actuator, the position or orientation of the implement or mechanical joint can be determined.

BACKGROUND OF THE INVENTION

Pneumatic and hydraulic cylinders are extensively used as actuators in mechanical arrangements for moving implements, arms, booms and other components of mobile hydraulic machines such as tractors, combines, excavators, dozers, loader-backhoes, etc. For example, tractor-mounted implements such as plows are typically supported by hitch assemblies that include hydraulic cylinders for raising and lowering the implements. Harvesting heads on combines, blades on dozers, and buckets on loader-backhoes are further examples of implements typically positioned by hydraulic cylinders.

Electrohydraulic control systems for such actuator assemblies typically rely upon position feedback signals representing the positions of the implements or mechanical joints being controlled. Some sensing assemblies (e.g., potentiometers, LVDTs) which provide position feedback signals are coupled directly to the implements or mechanical joints being controlled using external linkages. However, many sensing assemblies are subject to wear and difficulties relating to placement of such assemblies.

The positions of implements or mechanical joints can also be determined using sensing assemblies internal to the cylinder. The internal sensing assemblies measure the extension of the cylinders which move the implements or mechanical joints. Cylinder extension is determined by measuring the position of the piston within the cylinder housing. The piston, in turn, moves a cylinder rod coupled to the implement or mechanical joint. The position of the implement or the joint is then determined as a function of piston position which depends upon the geometry of the particular mechanical system.

Various forms of apparatus for measuring positions of pistons within hydraulic cylinders are available. For example, the positions of pistons within cylinders have been measured using acoustic signals, radiofrequency (RF) signals and microwave signals with different sensing assemblies and circuit configurations. However, these apparatus suffer from such drawbacks as relatively high complexity and cost, relatively low reliability, durability and accuracy, and the need to extensively modify the cylinders to accommodate the sensing assembly.

SUMMARY OF THE INVENTION

One embodiment of the present invention relates to a linear actuator of the type including a stationary portion and a moveable connector, and provides a method for determining the position of the connector relative to the stationary portion. The method includes the steps of generating electromagnetic (EM) bursts, transmitting the EM bursts from one of the stationary portion and the moveable connector, receiving the EM bursts at the other of the stationary portion and the moveable connector, generating a timing signal representative of the time for the EM bursts to travel between the stationary portion and the moveable connector, and converting the timing signal into a position signal representative of the distance between the stationary portion and the moveable connector.

Another embodiment of the present invention provides an actuator arrangement. The arrangement includes a stationary portion and a connector moveable relative to the stationary portion. The arrangement also includes a transmitter configured to transmit signals, wherein the transmitter is coupled to one of the connector and the stationary portion. A receiver is coupled to the other of the connector and the stationary portion and is configured to receive the signals.

A further embodiment of the present invention provides a hydraulic cylinder assembly. The assembly includes a cylinder having a closed first end and a second end having a sealed opening, a piston located within the cylinder, and a piston rod having a first rod end and a second rod end. The piston is attached to the first rod end and the piston rod is slidably positioned within the sealed opening. The cylinder includes a first hydraulic fluid port located at the closed first end of the cylinder to permit fluid to flow in and out of the cylinder, and a second hydraulic fluid port located at the second end of the cylinder to permit fluid to flow in and out of the cylinder. A transmitter is coupled to one of the second rod end and the second end of the cylinder, and is configured to transmit signals. A receiver is coupled to the other of the second rod end and the second end of the cylinder, and is configured to receive the signals.

Another embodiment of the present invention provides an electrohydraulic control system for controlling the positions of an implement. The control system includes an input device for generating command signals representative of a commanded position of the implement and a hydraulic actuator coupled to the implement. The hydraulic actuator includes a cylinder housing, a piston moveable within the cylinder housing, and a piston rod attached to the piston, whereby the piston rod moves with the piston. The control system includes a source of pressurized hydraulic fluid, a valve assembly for controlling the flow of hydraulic fluid between the actuator and the source in response to control signals, a generator for generating EM bursts, a transmitter coupled to one of the piston rod and the cylinder housing for launching the EM bursts in response to a transmit timing signal, and a receiver coupled to the other of the piston rod and the cylinder housing for generating a pulse detect signal and sampling the EM bursts at times which are delayed relative to the times the transmitter transmits the EM bursts. The control system also includes a timing circuit for generating a timing signal representative of the time for the EM bursts to travel from the transmitter to the receiver and a position signal generation circuit for converting the timing signal into a position signal representative of the position of the piston within the cylinder housing. The control system also includes a control circuit for generating the control signals based upon the command signals and the position signal, and for applying the control signals to the valve assembly.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
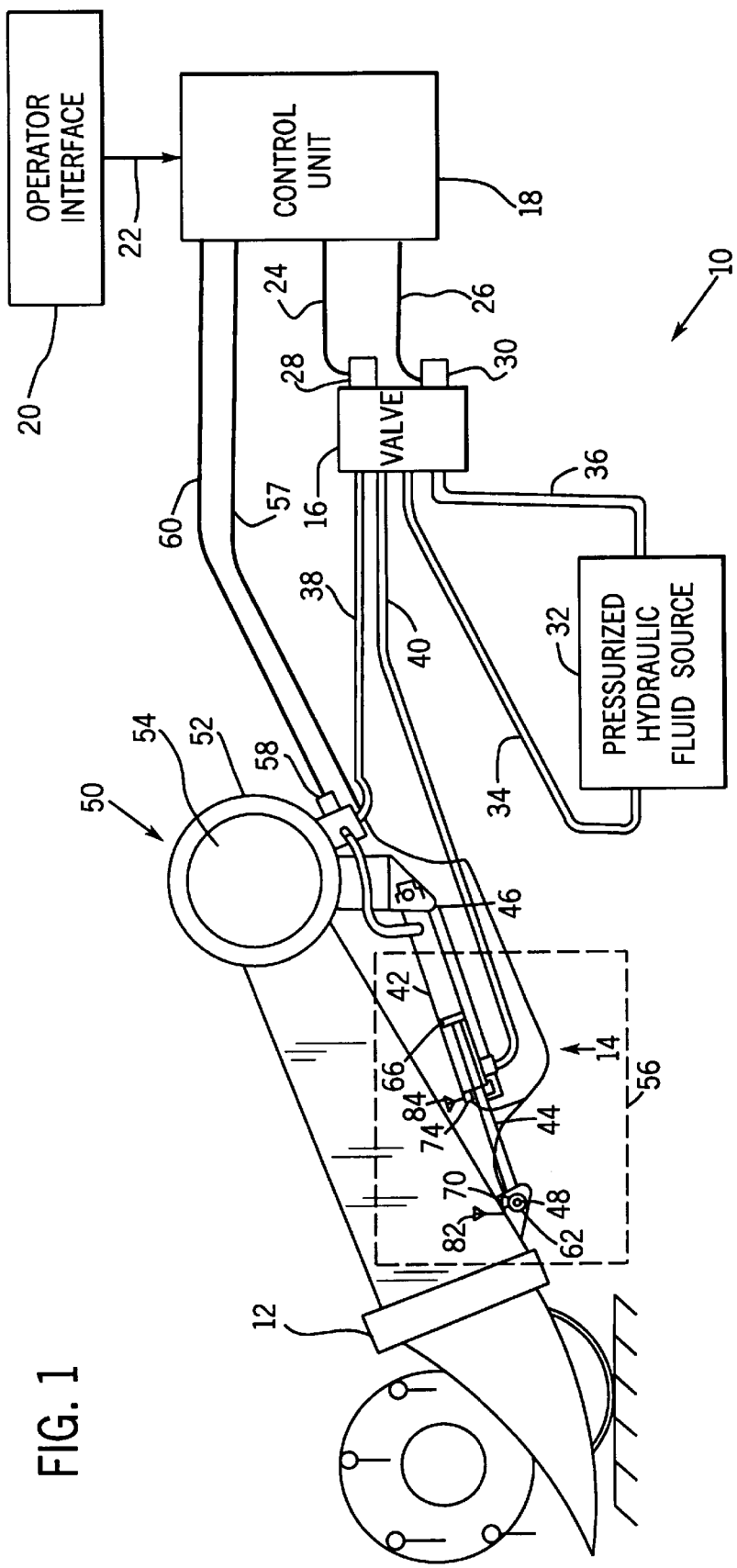
FIG. 1 is a block diagram illustrating an implement position control system for an off-highway vehicle.

Referring to FIG. 1, an electrohydraulic control system 10 used in an off-highway vehicle is shown. This system controls the position or orientation of a joint or implement 12 (e.g., combine head, plow, bucket, blade, etc.) of an agricultural vehicle (e.g., tractor, combine, etc.), or construction vehicle (e.g., backhoe, crane, dozer, trencher, wheeled, tracked or skid-steer loader, etc.).

Control system 10 controls the position of implement 12 using an actuator 14 supplied with pressurized fluid (e.g., hydraulic fluid, air, etc.) from a valve assembly 16. Valve assembly 16 receives raise and lower signals from a control unit 18 in response to commands from an operator interface 20. Control unit 18 can control the position of implement 12 in a closed-loop as described below.

Control unit 18 includes a microprocessor-based circuit or a dedicated, specific-purpose hard-wired circuit. Operator interface 20 includes operator-actuatable command devices such as potentiometers and switches which generate command signals sent to control unit 18 via a signal bus 22. The command signals, for example, represent raise and lower signals, reference position signals, raise and lower rate signals and mode select signals (e.g., manual, replay, return-to-position, float or height control mode). Other applications include different command devices which generate command signals appropriate for the particular application.

In response to the command signals from operator interface 20, control unit 18 generates a raise signal 24 and a lower signal 26 which are applied to a raise solenoid 28 and a lower solenoid 30 mounted on valve assembly 16, respectively. Raise signal 24 and lower signal 26 may be, for example, pulse-width-modulated (PWM) signals. In response to signals 24 and 26, valve assembly 16 controls the flow of pressurized fluid between a source 32 and actuator 14. Source 32 includes a pump connected in series with a fluid storage tank and filters (not shown). The fluid is transferred through conduits (e.g, hoses, tubes, etc.) 34, 36, 38 and 40.

In the present embodiment, actuator 14 includes a cylinder having a cylinder housing 42 and a cylinder rod 44 which is moved in the longitudinal direction of the cylinder by a piston 66 within cylinder housing 42. By way of a further example, a pneumatic cylinder may be used for other applications. In pneumatic cylinder applications, a pressurized gas is used as the fluid. The force which drives piston 66 is provided by the pressurized hydraulic fluid supplied to actuator 14 by valve assembly 16. The actuator 14 is connected between first and second attachment members 46 and 48 such that changes in the piston's position change the position or orientation of implement 12. Actuator 14 can also be oriented in the reverse direction such that rod 44 connects to attachment member 46 instead of 48.

Implement 12 is supported by a vehicle (not shown) using a bearing assembly 50 including first and second bearing portions 52 and 54. First bearing portion 52 is fixed and second bearing portion 54 is rotatable with respect to the vehicle. Implement 12 is fastened to second bearing portion 54 such that implement 12 is rotatable about the axis of bearing assembly 50. First and second attachment members 46 and 48 are connected to first bearing portion 52 and implement 12, respectively, so changes in extension of the cylinder cause implement 12 to rotate with respect to the vehicle.

Control unit 18 receives a position feedback signal from a position sensing arrangement 56 via a data conductor or bus 57. Depending upon the application, control unit 18 may also receive a pressure signal from a pressure sensor 58 via data conductor or bus 60. Position sensing arrangement 56 replaces other position sensors such as LVDTs mounted between implement 12 and bearing portion 52 by external linkages and operates based upon non-contact position sensing using radar. Pressure sensor 58 measures the pressure of the hydraulic fluid.

In operation, command devices within operator interface 20 send desired command signals to control unit 18. Control unit 18 responds by generating raise and lower signals and applying them to raise and lower solenoids 28 and 30 of valve assembly 16. Valve assembly 16 selectively controls the flow of pressurized hydraulic fluid from source 32 to front and rear ports of cylinder housing 42 which causes piston 66 within the cylinder to move longitudinally. Movement of piston 66 causes cylinder rod 44 to extend or retract, thereby changing the distance between attachment members 46 and 48. An increased distance causes implement 12 to rotate clockwise about bearing assembly 50 and a decreased distance causes implement 12 to rotate in the counterclockwise direction. Extension or retraction of actuator 14 is controlled by hydraulic fluid flow in and out of actuator 14, or can be determined by the interaction of implement 12 with the ground (e.g., in float mode). The position of implement 12 and the pressure (optional) of the fluid are provided to control unit 18 by position sensing arrangement 56 and pressure sensor 58 (optional). Thus, the position of implement 12 can be controlled in closed-loop fashion based upon an error signal between the command signals from operator interface 20 and position feedback signals from the position sensing arrangement 56.

Control system 10, except for the position sensing arrangement and its interface, is further described in U.S. Pat. No. 5,455,769, commonly assigned and incorporated herein by reference. A control system for a tractor hitch assembly is described in U.S. Pat. No. 5,421,416, and a system to move an arm on a construction vehicle using a cylinder is described in U.S. Pat. No. 5,000,650, both commonly assigned and incorporated herein by reference.

In the present embodiment, position sensing arrangement 56 determines the position or orientation of implement 12 based upon the position of a rod eye 62 connected to cylinder rod 44 relative to housing 42. Once the position of rod eye 62 is known, control unit 18 can calculate the position or orientation of implement 12 as a function of rod eye 62 position and the geometrical parameters of the machine system. Position sensing arrangement 56 includes micropower impulse radar (MIR) technology and operates as explained below.

Figure 2:
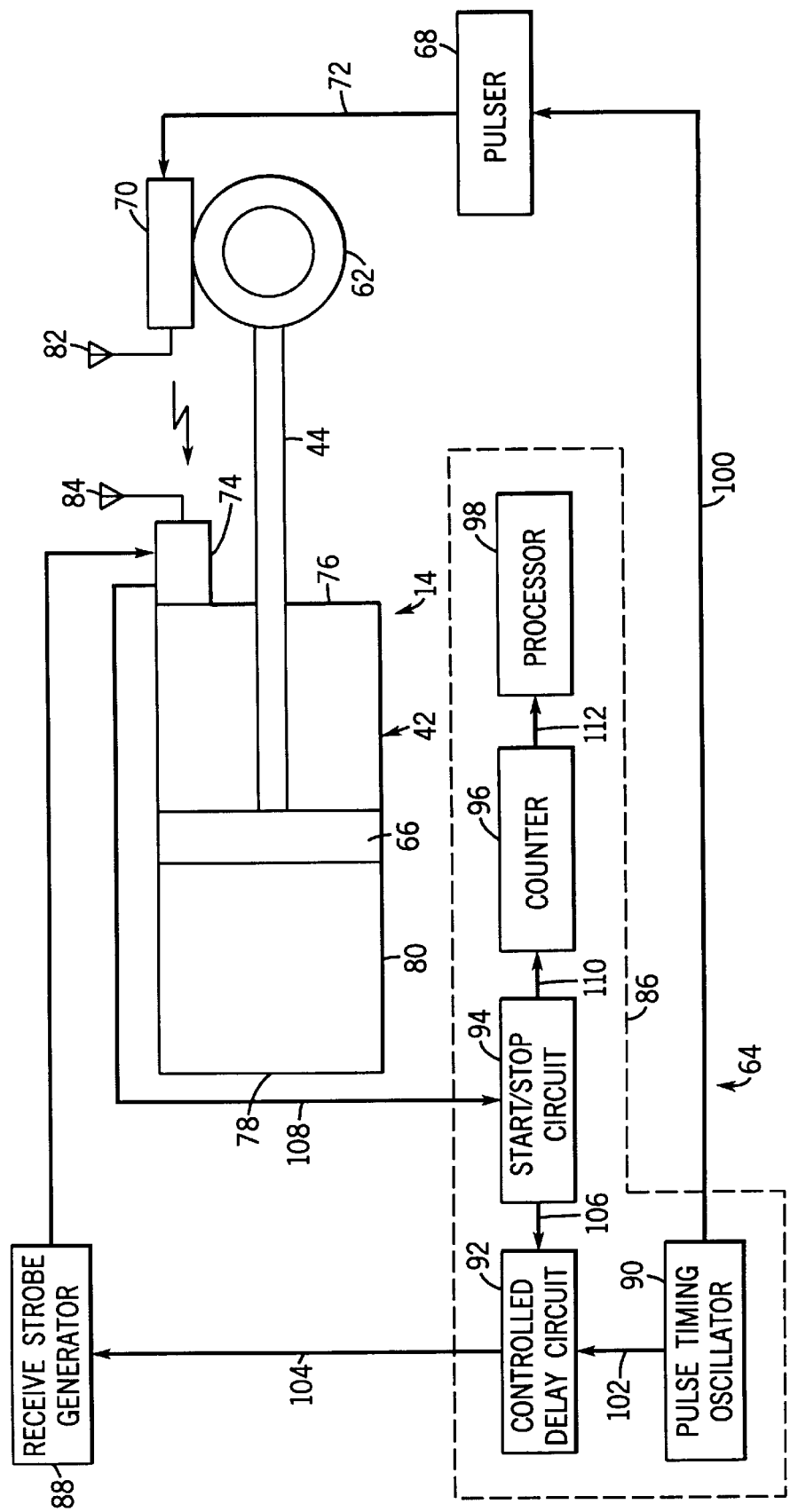
FIG. 2 is a block diagram showing a hydraulic cylinder and a circuit for sensing the position of a rod eye attached to a piston moveable within the cylinder by transmitting and receiving electromagnetic (EM) bursts such as ultra-wideband (UWB) pulses between the rod eye and the cylinder.

FIG. 2 shows actuator 14 and an MIR circuit 64 for sensing the position of rod eye 62 by transmitting and receiving electromagnetic (EM) pulses or bursts between cylinder housing 42 and rod eye 62. A sequence of EM bursts are generated by a pulser 68 and applied to a transmitter unit 70 via a transmission line 72. Transmitter unit 70 is attached to rod eye 62 and a receiver unit 74 is attached to a back end 76 of cylinder housing 42. By way of modification, the positions of transmitter unit 70 and receiver unit 74 can be reversed, or can be moved to other positions or structures having a fixed relationship to the positions of rod eye 62 and housing 42, respectively. Cylinder housing 42 also has a front end 78 and a cylindrical side wall 80 between ends 76 and 78. As shown in FIG. 2, transmitter unit 70 and receiver unit 74 are attached so that the line of sight between an antenna 82 attached to transmitter unit 70 and an antenna 84 attached to receiver unit 74 is substantially parallel with the longitudinal axis of piston rod 44. This configuration provides more accurate position sensing for rod eye 62. However, if the line of sight is not substantially parallel with the longitudinal axis, the position can be calculated by taking into account the angle θ therebetween (e.g., cos (θ) multiplied by line of sight distance).

Transmitter and receiver units 70 and 74 can be integral (i.e., one-piece) with their respective antennas 82 and 84, or can be separate from their respective antennas and connected by wires. An integral unit may be more cost-effective, while separate units may increase flexibility in mounting units 70 and 74. The transmitter is described in U.S. Pat. Nos. 5,457,394 and 5,517,198, incorporated herein by reference, and the receiver is described in U.S. Pat. Nos. 5,523,760 and 5,345,471, incorporated herein by reference. Transmitter unit 70 and receiver unit 74 discussed herein are integral units for purposes of calculating the position of rod eye 62 relative to housing 42.

MIR circuit 64 includes a timing circuit 86, a receive strobe generator 88, pulser 68, transmitter unit 70 with associated antenna 82, and receiver unit 74 with associated antenna 84. Timing circuit 86 generates a timing signal representative of the time for the EM bursts to travel from transmitter unit 70 to receiver unit 74. In particular, timing circuit 86 includes a pulse timing oscillator 90, a controlled delay circuit 92, a start/stop circuit 94, a counter 96 and a processor 98. The operation of timing circuit 86 is described below.

Pulse timing oscillator 90 generates a transmit timing signal which is applied to pulser 68 over bus 100. The transmit timing signal is generated at a pulse repetition rate of approximately two megahertz. Pulser 68 receives the transmit timing signal and generates real-time pulses which are applied to transmitter unit 70 over transmission line 72. Unit 70 transmits the EM pulses through antenna 82 based upon the real-time pulses received from pulser 68.

Pulse timing oscillator 90 also supplies the transmit timing signal to controlled delay circuit 92 over a bus 102. Controlled delay circuit 92 generates a receive timing signal over a bus 104. Receive strobe generator 88 receives the receive timing signal and strobes a sample gate in receiver unit 74 at the pulse repetition rate, but at times which are delayed relative to the times transmitter unit 70 transmits the EM pulses.

Controlled delay circuit 92 is also coupled to start/stop circuit 94 via a bus 106. Start/stop circuit 94 includes a sweep oscillator which oscillates at approximately 70 Hz and is designed to oscillate under 100 Hz. Start/stop circuit 94 generates a ramp signal which is applied to controlled delay circuit 92 over bus 106 to control the timing of the strobes generated by receive strobe generator 88. Receiver unit 74 generates a pulse detect signal in response to the samples of the sequence of EM pulses which is applied to start/stop circuit 94 over a bus 108. Start/stop circuit 94 generates a start signal at the beginning of each sweep and a stop signal in response to the pulse detect signal detected on bus 108. The start signals and the stop signals generated by start/stop circuit 94 are applied to controlled delay circuit 92 over bus 106.

Start/stop circuit 94 also supplies counter 96 with the start signals and the stop signals over a bus 110. Upon receipt of the start signal from start/stop circuit 94, counter 96 is initiated and begins counting at a rate of approximately ten megahertz. After receiver unit 74 detects the EM pulse, receiver unit 74 generates the pulse detect signal which is applied to start/stop circuit 94 over bus 108. Start/stop circuit 94 then generates a stop signal which is applied to counter 96 over bus 110. The value of counter 96 upon receipt of the stop signal represents the timing signal. The timing signal is the time-of-flight of an EM pulse from transmitter unit 70 to receiver unit 74, which is the difference between the delay of a strobe pulse at the beginning of a sweep and the delay of a strobe pulse when the pulse detect signal is generated. Counter 96 supplies the timing signal to processor 98 over a bus 112.

Control unit 18 includes a position signal generation circuit which determines the position of transmitter unit 70 based on the timing signal and converts the timing signal into a position signal representative of the distance between rod eye 62 and front end 76 of cylinder housing 42.

Preferably, the EM bursts are ultra-wideband (UWB) or square-wave pulses. U.S. Pat. No. 5,457,394, herein incorporated by reference, describes a circuit including a generator of UWB pulses which are 200 psec wide, and are repeated at a pulse-repetition interval (PRI) of 1 Mhz. However, other pulse widths and PRIs can be used. The UWB pulses are repeated to allow the integration or averaging of approximately 10,000 pulses for increased noise immunity. Noise immunity can be further increased by modulating (e.g., dithering or randomizing) the pulses. The UWB pulses are unlike acoustic, RF and microwave signals since they are a sequence of impulses having no carrier frequency. No specific frequency is associated with the UWB pulses, and the frequency spectrum is related by the Fourier transform of the pulses. The UWB term refers to the wide spectrum of frequencies comprising the pulses. A timing circuit for measuring the direct time-of-flight of the EM pulses or bursts between a transmitter and a receiver is described in U.S. Pat. No. 5,661,490, incorporated herein by reference. A pulse timing oscillator used to supply a transmit signal to a transmitter and a controlled delay circuit used to supply a receive timing signal to a receive strobe generator are also described in this patent.

The signals, however, are not limited to EM bursts. Other types of signals having different timing circuits (e.g., ultrasonic or laser signals) may be transmitted from transmitter unit 70 to receiver unit 74. Moreover, the EM bursts are not limited to square pulses and the bursts may include pulses having any shape and form, including pulses generated by a highly-focused antenna. For example, the pulses may include sine-wave signals or a combination of sine-wave signals having a carrier frequency component in the RF, microwave, etc. signal range. The frequency pulses are repeated at a predetermined frequency less than the frequency of the carrier. The circuitry for generating frequency pulses is more complex and expensive than the circuitry used to generate square pulses.

Circuit 64 operates in the time domain since the position of piston 66 is measured by the equivalent timing signal generated by timing circuit 86. Pulser 68 generates real-time pulses which are applied to transmitter unit 70. Transmitter unit 70 transmits real-time signals through antenna 82 based upon the real-time pulses received from pulser 68. Circuit 64 operates in the time domain regardless of whether the EM bursts include UWB pulses or pulses having a frequency component. Operation in the time domain simplifies the circuitry compared with operation in the frequency domain (e.g., measuring piston position by determining the resonance frequency of a cavity formed by the piston and the cylinder). As previously incorporated by reference, U.S. Pat. No. 5,661,490 more particularly describes the sampling of the real-time pulses over a range of delay and the generation of an equivalent time sample signal.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, where compensation is required, different compensation schemes could be used such as second transmitter and receiver units located at a fixed position from each other so that the position of rod eye 62 can be scaled based upon the signals generated by the second receiver unit. Additionally, various other measurement principles may be used for measuring positions of pistons in hydraulic cylinders (e.g., ultrasonic and laser technologies). Finally, as this technology develops, digital and analog circuits may be interchanged, and one or more of the circuits may become integrated into a single IC.

What is claimed is:

1. For a linear actuator of the type including a stationary portion and a moveable connector, a method for determining the position of the connector relative to the stationary portion comprising the steps of:

generating electromagnetic (EM) bursts;

transmitting the EM bursts from one of the stationary portion and the moveable connector;

receiving the EM bursts at the other of the stationary portion and the moveable connector;

generating a timing signal representative of the time for the EM bursts to travel between the stationary portion and the moveable connector; and converting the timing signal into a position signal representative of the distance between the stationary portion and the moveable connector.

2. The method of claim 1, wherein the EM bursts include ultra-wideband pulses.

3. The method of claim 1, wherein the EM bursts include pulses having a carrier frequency component.

4. The method of claim 1, wherein the actuator includes a cylinder housing and a piston rod moveable within the cylinder housing, the connector being attached to the piston rod, and the step of transmitting the EM bursts is performed by a transmitter attached to one of the connector and the cylinder housing.

5. The method of claim 4, further comprising the step of receiving the EM bursts with a receiver attached to the other of the connector and the cylinder housing.

6. The method of claim 5, further comprising the steps of supplying a transmit timing signal to a transmitter and supplying a receive timing signal to the receiver, wherein the receiver samples the EM bursts at times which are delayed relative to the times the transmitter transmits the EM bursts.

7. The method of claim 1, wherein the EM bursts are real-time signals and the timing signal is an equivalent-time signal.

8. An actuator arrangement comprising:

a stationary portion;

a connector moveable relative to the stationary portion;

a transmitter configured to transmit signals, the transmitter being coupled to one of the connector and the stationary portion; and a receiver configured to receive the signals, the receiver being coupled to the other of the connector and the stationary portion.

9. The arrangement of claim 8, wherein the signals are EM bursts.

10. The arrangement of claim 8, wherein the signals are ultrasonic signals.

11. The arrangement of claim 8, wherein the signals are laser signals.

12. The arrangement of claim 9, further comprising a timing circuit configured to generate a timing signal representative of the time for the EM bursts to travel from the transmitter to the receiver.

13. The arrangement of claim 12, wherein the EM bursts include ultra-wideband pulses.

14. The arrangement of claim 13, wherein the stationary portion is a cylinder having a piston which is moveable within the cylinder, the piston being attached to a piston rod and the piston rod being attached to the connector.

15. The arrangement of claim 14, wherein the connector is a rod eye.

16. The arrangement of claim 12, wherein the EM bursts include pulses having a carrier frequency component.

17. The arrangement of claim 9, wherein the transmitter includes a first antenna attached to the one of the connector and the stationary portion, and the receiver includes a second antenna attached to the other of the connector and the stationary portion.

18. The arrangement of claim 17, wherein the transmitter and the receiver are electromagnetically coupled to the first and the second antennas, respectively.

19. The arrangement of claim 12, wherein the timing circuit comprises:

a pulse timing oscillator for supplying a transmit timing signal to the transmitter; and a controlled delay circuit for supplying a receive timing signal to a receive strobe generator, wherein the receive strobe generator strobes a sample gate in the receiver at times which are delayed relative to the times the transmitter transmits the EM bursts.

20. The arrangement of claim 19, wherein a START/STOP circuit having a sweep oscillator supplies the controlled delay circuit with a START signal at the start of a sweep and a STOP signal in response to a pulse detect signal generated by the receiver.

21. The arrangement of claim 20, wherein a counter is initiated in response to the START signal and the counter is stopped in response to the STOP signal.

22. The arrangement of claim 21, wherein upon receipt of the STOP signal, the value of the counter represents the timing signal.

23. A hydraulic cylinder assembly comprising:
- a cylinder having a closed first end and a second end having a sealed opening;
- a piston located within the cylinder;
- a piston rod having a first rod end and a second rod end, the piston being attached to the first rod end and the piston rod being slidably positioned within the sealed opening;
- a first hydraulic fluid port located at the closed first end of the cylinder to permit fluid to flow in and out of the cylinder;
- a second hydraulic fluid port located at the second end of the cylinder to permit fluid to flow in and out of the cylinder;
- a transmitter configured to transmit signals, the transmitter being coupled to one of the second rod end and the second end of the cylinder; and
- a receiver configured to receive the signals, the receiver being coupled to the other of the second rod end and the second end of the cylinder.

24. The assembly of claim 23, wherein the signals are EM bursts.

25. The assembly of claim 24 further comprising a timing circuit configured to generate a timing signal representative of the time for the EM bursts to travel from the transmitter to the receiver.

26. The assembly of claim 25, wherein the EM bursts include ultra-wideband pulses.

27. The assembly of claim 25, further comprising a position signal generation circuit coupled to the timing circuit for monitoring the timing signal and generating a position signal representative of the distance between the second rod end and the second end of the cylinder.

28. The assembly of claim 23, wherein the transmitter includes a first antenna attached to the one of the second rod end and the second end of the cylinder, and the receiver includes a second antenna attached to the other of the second rod end and the second end of the cylinder.

29. The assembly of claim 28, wherein the transmitter and receiver are electromagnetically coupled to the first and second antennas, respectively.

30. The assembly of claim 25, wherein the timing circuit comprises:
- a pulse timing oscillator for supplying a transmit timing signal to the transmitter; and
- a controlled delay circuit for supplying a receive timing signal to a receive strobe generator, wherein the receive strobe generator strobes a sample gate in the receiver at times which are delayed relative to the times the transmitter transmits the EM bursts.

31. An electrohydraulic control system for controlling the positions of an implement, comprising:
- an input device configured to generate command signals representative of a commanded position of the implement;
- a hydraulic actuator coupled to the implement and including a cylinder housing, a piston moveable within the cylinder housing, and a piston rod attached to the piston, whereby the piston rod moves with the piston;
- a source of pressurized hydraulic fluid;
- a valve assembly coupled between the actuator and the source, the valve assembly configured to control the flow of hydraulic fluid between the actuator and the source in response to control signals;
- a generator for generating EM bursts;
- a transmitter coupled to one of the piston rod and the cylinder housing, the transmitter configured to launch the EM bursts in response to a transmit timing signal;
- a receiver coupled to the other of the piston rod and the cylinder housing, the receiver configured to generate a pulse detect signal and sample the EM bursts at times which are delayed relative to the times the transmitter transmits the EM bursts;
- a timing circuit configured to generate a timing signal representative of the time for the EM bursts to travel from the transmitter to the receiver;
- a position signal generation circuit configured to convert the timing signal into a position signal representative of the position of the piston within the cylinder housing; and
- a control circuit coupled to the input device, the valve assembly and the position signal generation circuit, the control circuit configured to generate the control signals based upon the command signals and the position signal, and to apply the control signals to the valve assembly.

* * * * *